United States Patent [19]

Bourdet et al.

[11] Patent Number: 4,492,464
[45] Date of Patent: Jan. 8, 1985

[54] APPARATUS AND METHOD FOR DISTANCE MEASUREMENT BY LASER INTERFEROMETRY

[75] Inventors: Gilbert L. Bourdet, Bures sur Yvette; Michel A. Franco, Paris, both of France

[73] Assignee: Agence Nationale de Valorisation de la Recherche, Paris, France

[21] Appl. No.: 593,927

[22] Filed: Mar. 27, 1984

Related U.S. Application Data

[63] Continuation-in-part of Ser. No. 197,905, Oct. 17, 1980, abandoned.

[30] Foreign Application Priority Data

Oct. 17, 1979 [FR] France ............... 79 25771

[51] Int. Cl.$^3$ .............................................. G01C 3/00
[52] U.S. Cl. ...................................... 356/4.5; 356/349
[58] Field of Search ............... 356/349, 351, 352, 355, 356/356, 357, 358, 4.5

[56] References Cited

U.S. PATENT DOCUMENTS 3,661,464  5/1972  Hubbard ................................ 356/4.5
3,970,389  7/1976  Mendrin et al. .................. 356/106 R

FOREIGN PATENT DOCUMENTS 2035878 12/1970 France .
2051899  4/1971 France .
2245932  4/1975 France .

OTHER PUBLICATIONS

Bien et al., "Absolute Distance Measurements by Variable Wavelength Interferometry", Applied Optics, vol. 20, No. 3, Feb. 1, 1981.
French Search Report.

*Primary Examiner*—Bruce Y. Arnold
*Attorney, Agent, or Firm*—Schwartz, Jeffery, Schwaab, Mack, Blumenthal and Koch

[57] ABSTRACT

The apparatus and method include adjusting two single frequency lasers to separate longitudinal modes of an interferometer, the plates of which are separated by a distance to be measured. A rough estimate of the distance is made using a tape measure or the like. The rough estimate, together with the frequency distance ($\Delta F$) of the lasers adjusted to the longitudinal modes of the interferometer is used to solve the equation:

$$k_1 = \frac{L_1 \times 2 \Delta F}{c}$$

where c is the speed of light and $L_1$ is the rough estimate. The parameter k then calculated by rounding $k_1$ to the nearest integer and the accurate distance L is calculated according to the equation:

$$L = \frac{kc}{2 \Delta F}$$

10 Claims, 5 Drawing Figures

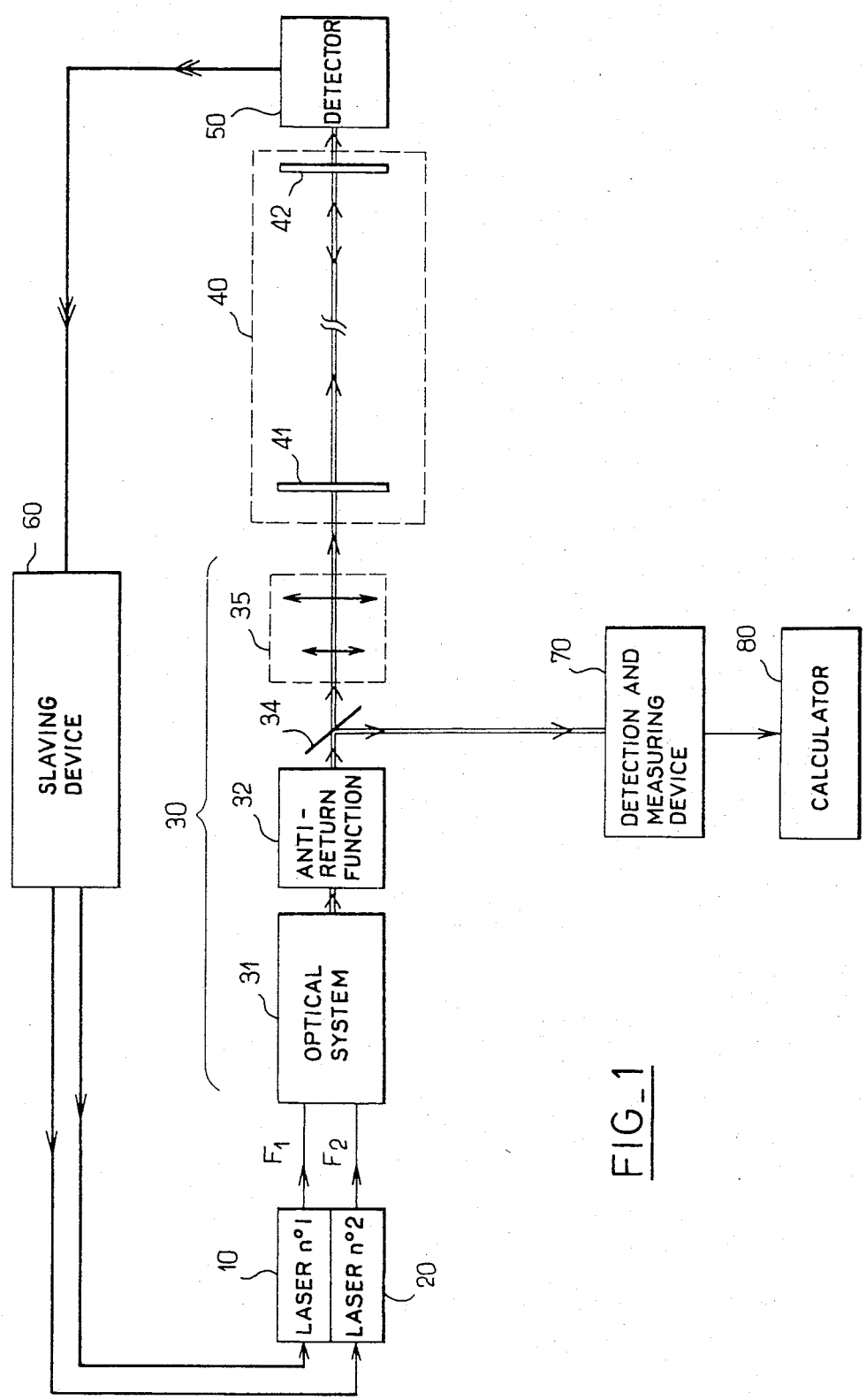
FIG_1

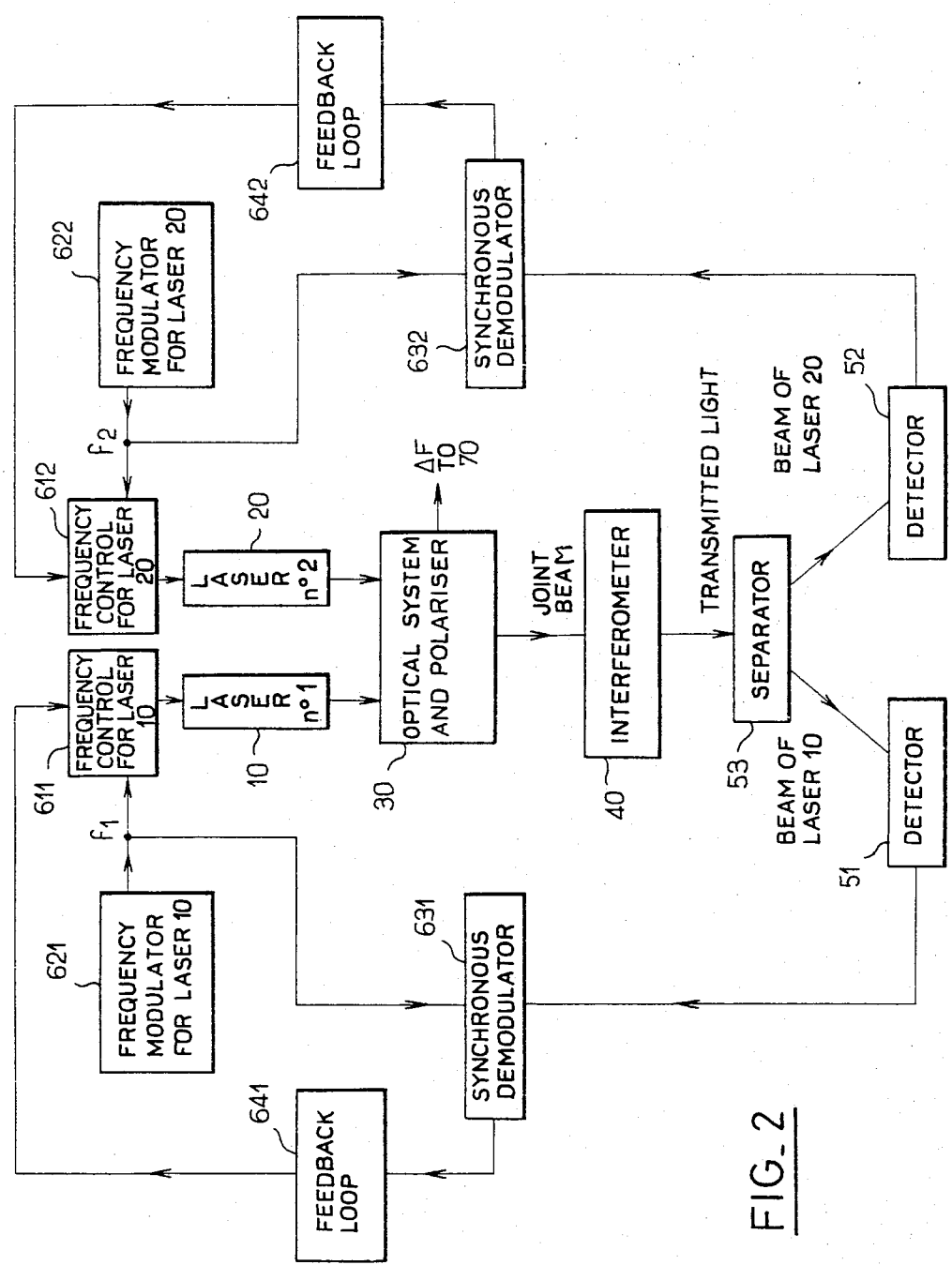
FIG_2

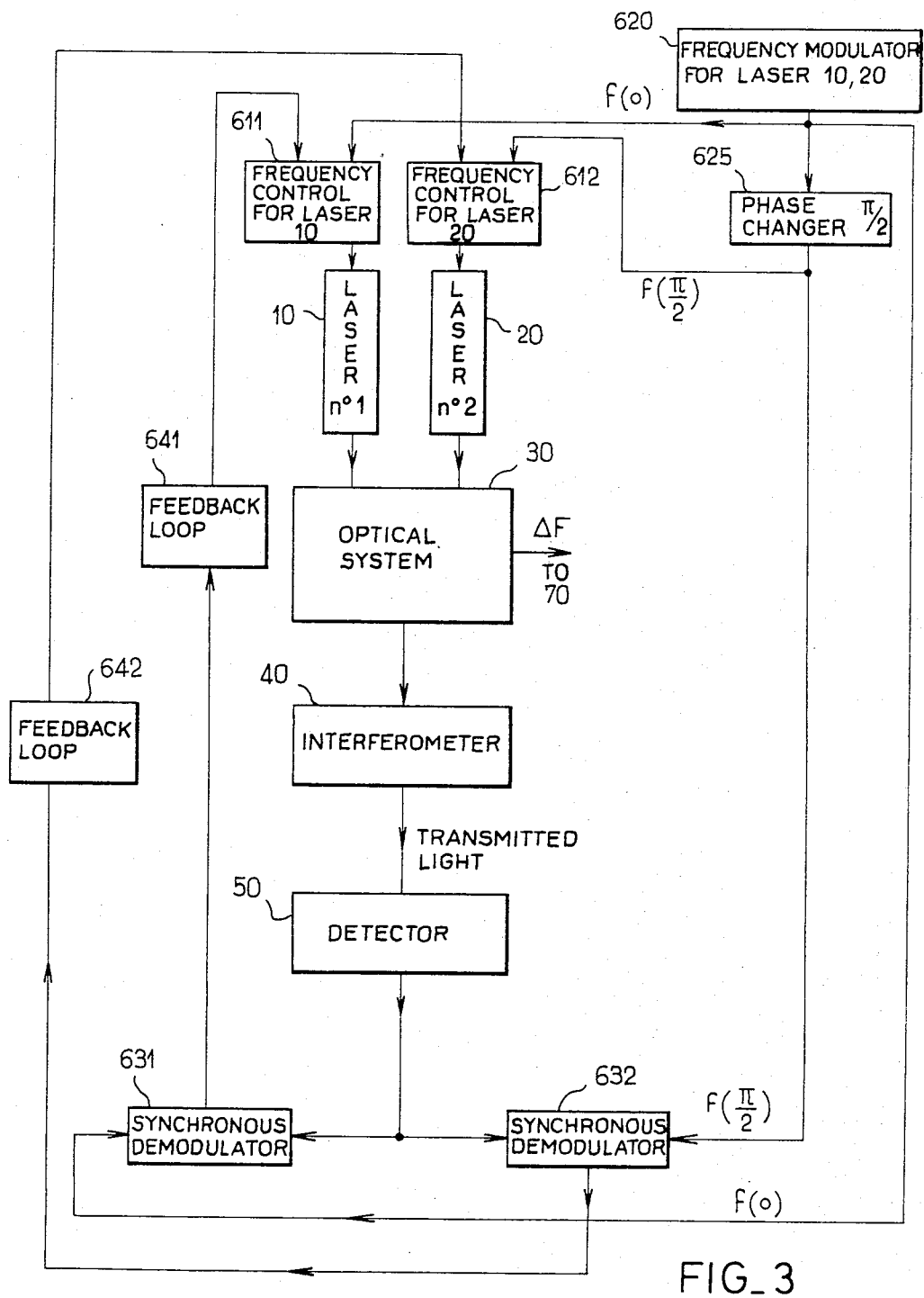
FIG_3

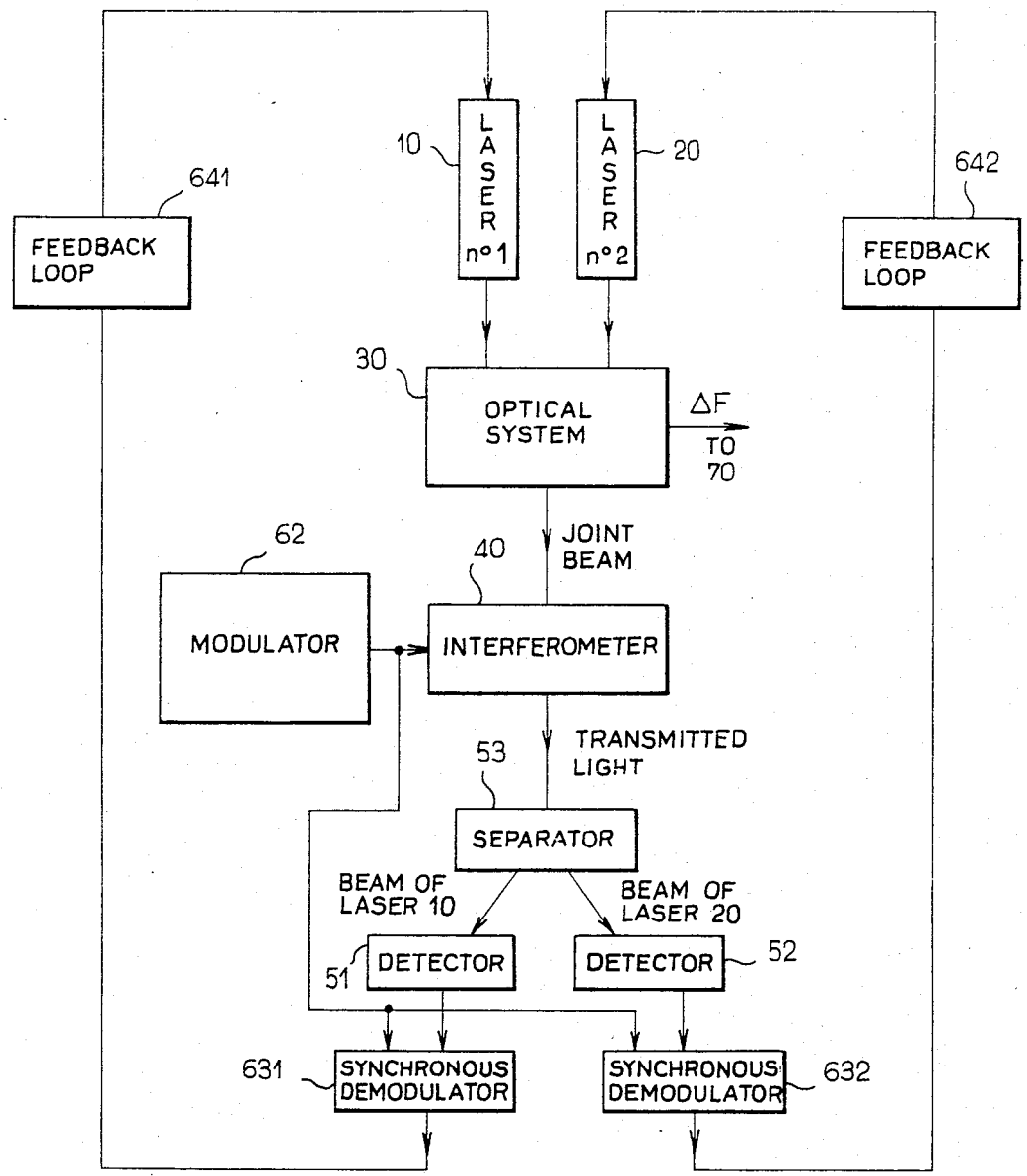
FIG_4

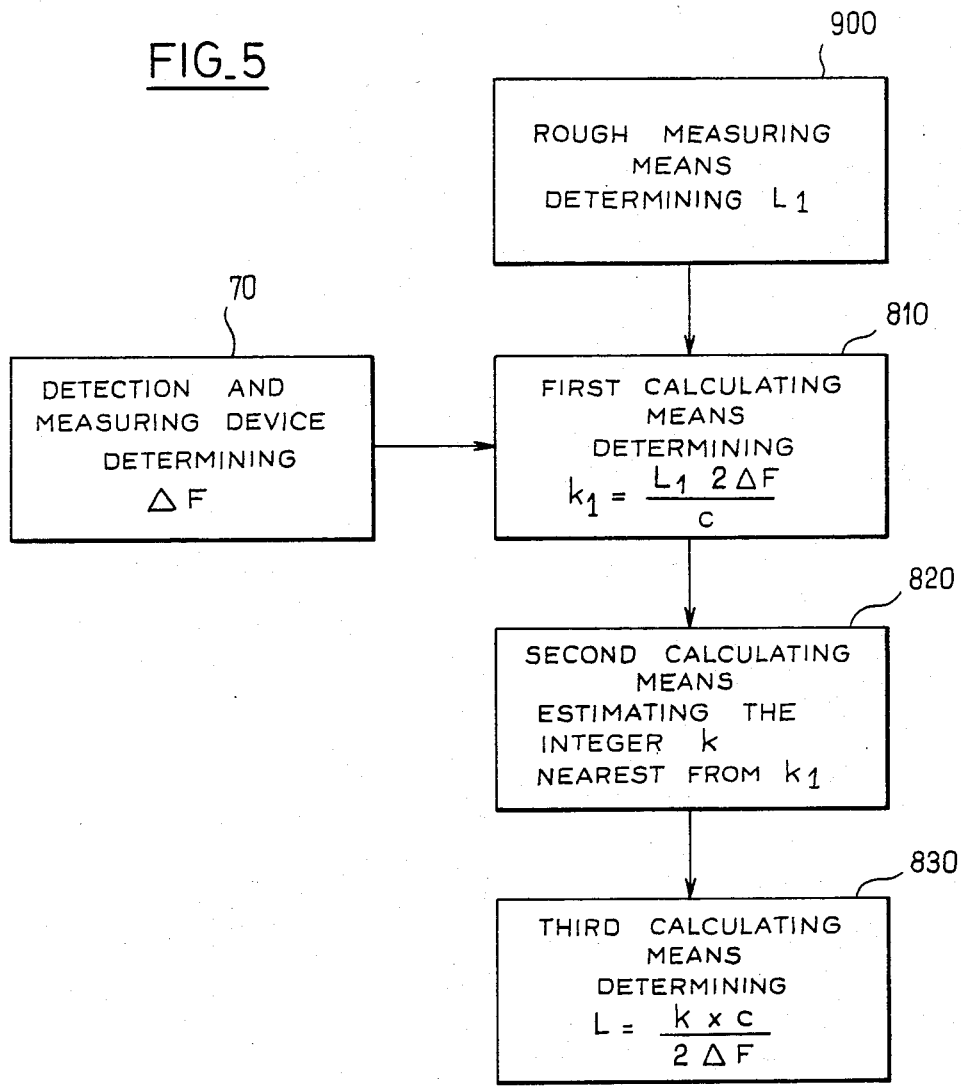

APPARATUS AND METHOD FOR DISTANCE MEASUREMENT BY LASER INTERFEROMETRY

CROSS REFERENCE TO RELATED APPLICATIONS

This is a Continuation-in-Part of application Ser. No. 197,905 now abandoned filed Oct. 17, 1980.

BACKGROUND OF THE INVENTION

1. Field of the Invention

The present invention relates to the measurement of distances by laser interferometry in which the interval between the two plates of an interferometer forms the distance to be measured. Since these plates are partial reflectors, they are also called mirrors or reflectors.

2. Description of the Prior Art

In a first known process, the frequency of the laser radiation remains constant and one of the mirrors of the interferometer is moved away from the other mirror along the distance to be measured. The interference fringes which occur during the movement are counted to provide an indication of the distance. This process, which is very precise, is slow and delicate to use, as the device for moving the mirror must conform to very strict tolerances related to the wavelength of the laser radiation, as well as linearity and monotony of the motion. Moreover, such a measurement is very sensitive to turbulence in the ambient atmosphere. This first process is not practically acceptable for distances on the order of one meter or more.

A second process uses a radiation source which emits very short pulses of radiation, and then measures the time which the light takes to propagate over the distance to be measured. Limits, inherent to the time measuring means as well as in the duration of the pulses generated, result in an error on the order of 3 cm in any distance measurement. Precision within this limit is only satisfactory over very great distances, much greater than ten meters.

According to a third process, a modulated electromagnetic wave is applied to an interferometer. The modulation frequency is then adjusted so that it coincides with a resonance frequency of the interferometer. In the case of laser radiation modulated to 100 MHz (wavelength of 3 meters) which is brought to resonate the interferometer with an error on the order of one thousandth of the wavelength, precision is on the order of 3 mm. This process is useful only for relatively great distances (beyond one hundred meters).

According to a process described by MENDRIN et al in U.S. Pat. No. 3,970,389, cyclic variations in the interference pattern from an interferometer are produced by varying the wavelength of the radiation. More precisely, the interferometer produces an adjustable frequency laser beam which is divided between a target mirror and a reference mirror, the distance between which is to be measured. The laser frequency is moved between a starting frequency and a stopping frequency. The number of fringes produced is counted. This count, together with the known starting and stopping frequencies, produces an indication of the desired distance.

SUMMARY OF THE INVENTION

According to a first aspect of the invention, there is provided a process for precisely measuring distances. The process comprises the steps of arranging two spaced plates of an interferometer at a distance apart denoted L which is the distance to be measured, applying to the plates two beams of radiation of differing frequencies from respective lasers, adjusting the frequencies of the lasers independently of one another so that they correspond to two different longitudinal modes of the interferometer, respectively, measuring the difference ($\Delta F$) between said frequencies after adjustment, carrying out a rough measurement of the distance to be measured so as to obtain a rough estimated value denoted $L_1$ of said distance to be measured, calculating a number $k_1$ by the equation:

$$k_1 = \frac{L_1 \times 2 \Delta F}{c}$$

where c is the speed of light in the interferometer, determining an integer k which is the nearest integer to $k_1$, and then calculating the distance (L) between the two plates of the interferometer by the equation:

$$L = \frac{kc}{2 \Delta F}$$

According to a second aspect of the invention, there is provided an apparatus for precisely measuring distance and comprising two lasers for producing respective beams of radiation having respective differing frequencies, means for individually varying the single frequencies of the two lasers, optical means for directing the two laser beams from the two lasers, an interferometer having two plates and receiving the two laser beams from the optical means slaving means for operating the means for individually varying the frequencies of the two lasers so that they correspond to two different longitudinal modes of the interferometer, respectively, means for determining the different $\Delta F$ between the frequencies after adjustment, rough measuring means adapted to determine a rough estimated value denoted $L_1$ of the distance between the two plates of the interferometer, first calculating means for calculating a number $k_1$ by the equation:

$$k_1 = \frac{L_1 \times 2 \Delta F}{c}$$

where c is the speed of light in the interferometer, second calculating means for determining an integer k which is the nearest integer to $k_1$, and third calculating means for calculating the distance (L) between the two plates of the interferometer from the difference ($\Delta F$) of the frequencies of the beams when adjusted, in accordance with the equation:

$$L = \frac{kc}{2 \Delta F}$$

BRIEF DESCRIPTION OF THE DRAWINGS

FIG. 1 is a block diagram illustrating generally one embodiment of a process and apparatus according to the present invention; FIG. 2 is a schematic block diagram of the control system for the embodiment of FIG. 1; FIG. 3 is a block diagram of a simplified version of the control system of FIG. 2; FIG. 4 is a block diagram of an alternative embodiment of the invention; and FIG. 5 is a schematic block diagram of the calculating means embodied in the apparatus according to the invention.

DESCRIPTION OF THE PREFERRED EMBODIMENTS

Referring first to FIG. 1, two lasers 10 and 20 produce respective beams of radiation which are conducted along a common path, in a known manner, by a connecting optical system 31.

Next, at 32, an anti-luminous return function is effected, accompanied generally by polarization of the beams.

A partial reflection separator plate 34 deflects part of the joint beam of the lasers 10, 20 toward a detection and measuring device 70. The other part of the beam passes through a collimator 35, which adapts the characteristics of the beams and makes them compatible with the interferometer 40, before reaching the interferometer 40. Interferometer 40 comprises two partly reflecting plates 41 and 42. The distance between these plates defines the distance to be measured.

The light transmitted or outputted by the interferometer is collected by a detector arrangement 50. A slaving device 60 slaves the frequencies of the two lasers 10 and 20 with the aid of the signals from the detector 50. This slaving is effected in such a manner that the frequencies ($F_1$ and $F_2$) of these two lasers substantially coincide with two different longitudinal modes of the interferometer. That is, these two frequencies $F_1$ and $F_2$ correspond to two different peaks of the amplitude versus frequency response of the interferometer.

The detection and measuring device 70 comprises, for example, an intermodulation type detector from which there is obtained a signal indicative of $F_1-F_2$, which is measured by an electronic counter. A calculator 80 determines the distance between the plates 41 and 42 of the interferometer from the frequency difference measured by the counter according to a process which will be described hereinafter with reference to FIG. 5.

The lasers 10, 20 may be of various types. At present, preference is given to waveguide lasers of the carbon dioxide type. These lasers are single-mode, very powerful, and able to undergo a fairly wide frequency variation by varying the dimensions of the cavity. However, other longitudinal monomode lasers, with or without a waveguide, may also be suitable. It is also advantageous for the lasers to be transverse monomodes, in order to facilitate detection of the wave surface.

In practice, to obtain the best performance, it is desirable to unite the two lasers 10 and 20 within a common enclosure, such as an Invar block. Such a common housing provides, in addition to a common mechanical structure, a common electrical supply, gas circuit and cooling circuit.

As discussed above, detection and measuring device 70 generates a signal representative of the difference $\Delta F$ between the two frequencies when these frequencies are adjusted, respectively, to the two interferometer modes. Device 70 may includes any one of numerous types of sensors. It is desirable that the sensor should be fast, have a wide-band width and be sensitive, while presenting a good quadratic response (luminous power sensor). Thus, it is possible to advantageously use a fast Hg-Cd Te sensor sold by Societe Anonyme des Telecommunications, or an MIM (metal-insulator-metal) type diode, or other detectors sensitive to the luminous frequencies concerned.

In addition to the sensor itself, the device 70 comprises a pre-amplifier, such as type an HP 84 470 and a counter such as HP 5345 A. The calculation unit 80 may be, for example, an HP 9825 A calculator. All these elements are sold by HEWLETT-PACKARD COMPANY.

With reference to FIG. 5, a description will now be given of the calculator 80.

Calculator 80 comprises a first calculating means 810 which is sensitive to the detection and measuring device 70, on the one hand, and to rough measuring means 900, on the other hand. As stated above, the detection and measuring device 70 outputs a signal representative of the difference $\Delta F$ between the frequencies $F_1$ and $F_2$ of the two lasers 10, 20 when adjusted, respectively, to the two longitudinal modes of the interferometer. The rough measuring means 900 stores a rough estimated value denoted $L_1$ of the distance between the two plates 41, 42 of the interferometer. The manner in which the rough estimate, stored on the rough measuring means 900, is taken depends on the range of the distance L to be measured. Short distances can be measured with a tape measure, for example, and stored beforehand in rough measuring means 900. However, any other classical equivalent measuring means can be used to determine the rough estimated value $L_1$ of the distance to be measured.

On the basis of the output signal $\Delta F$ from the detection and measuring device 70 and of the rough estimated value $L_1$, the first calculating means 810 calculates a number $k_1$ by the equation:

$$k_1 = \frac{L_1 \times 2 \Delta F}{c}$$

where c is the speed of light in the interferometer 40.

Then second calculating means 820 is connected to the first calculating means and receives the value for $k_1$. Calculating means 820 determines an integer k which is the nearest integer to $k_1$.

Finally, third calculating means 830 is connected to the second calculating means and receives the integer value for k. Calculating means 830 calculates the distance L between the two plates 41 and 42 of the interferometer, from the difference $\Delta F$ of the frequencies of the beams when adjusted, in accordance with the equation:

$$L = \frac{kc}{2 \Delta F}$$

Two examples of the calculation will now be given so as to clearly explain the above described calculation process.

EXAMPLE 1

Assuming:

(1) the precise distance to be measured (distance between the two plates 41, 42 of the interferometer) is 2.125304 m,
(2) the rough measure $L_1$ determined by a tape measure is 2 m,
(3) the difference $\Delta F$ between the frequencies of the two lasers determined by the detection and measuring device 70 is $\Delta F = 211.5880$ MHz,
the first calculating means 810 determines $$k_1 = \frac{L_1 \times 2 \Delta F}{c} = \frac{2 \times 2 \times 211.5880 \times 10^6}{c} = 2.823126$$

On this basis, the second calculating means 820 determines the integer $k = 3$ (nearest integer to $k_1 = 2.823126$).

Then the third calculating means 830 determines the distance L to be measured by the equation:

$$L = \frac{k \times c}{2 \Delta F} = \frac{3 \times c}{2 \times 211.588 \times 10^6} = 2.1253037 \text{ m.}$$

EXAMPLE 2

Assuming:
(1) the precise distance to be measured is 13.450775 m,
(2) the rough measure $L_1$ determined by a tape measure is 13.5 m,
(3) the diffrence $\Delta F$ between the frequencies of the two lasers determined by the detection and measuring device 70 is $\Delta F = 178.3050$ MHz,
the first calculating means 810 determines $$k_1 = \frac{L_1 \times 2 \Delta F}{c} = \frac{13.5 \times 2 \times 178.305 \times 10^6}{c} = 16.0585$$

On this basis, the second calculating means 820 determines the integer $k = 16$ (k is the nearest integer to $k_1 = 16.0585$).

Then the third calculating means 830 determines the distance L to be measured by the equation:

$$L = \frac{k \times c}{2 \Delta F} = \frac{16 \times c}{2 \times 178.305 \times 10^6} = 13.450773 \text{ m.}$$

A description will now be given of a control system for the first embodiment of the slaving device, referring to FIG. 2.

The two $CO_2$ waveguide lasers are joined as described above with reference to the drawings, and their cavities are individually adjustable, for example, with the aid of piezo-electric wedges, which permit individual variation of their operating frequencies $f_1$ and $f_2$.

This variation is controlled by electronic circuits 611 and 612, which act on the lasers 10 and 20 respectively. In this embodiment, circuits 611 and 612 act on the respective piezo-electric wedges of lasers 10 and 11.

Two feedback loops 641 and 642 control the base frequencies $f_1$ and $f_2$ of the two lasers 10 and 20 respectively, through the circuits 611 and 612. In this embodiment, the base frequencies $f_1$ and $f_2$ are subject to frequency modulation at respective frequencies $f_1$ and $f_2$ defined by the modulation signals originating from the circuits 621 and 622.

The frequencies of the two laser radiations thus vary symmetrically, preferably sinusoidally, around the central frequencies $f_1$ and $f_2$. Naturally, the modulation frequencies $f_1$ and $f_2$ may be equal.

These frequencies $f_1$ and $f_2$ are also applied to synchronous demodulator circuits 631 and 632, the outputs of which control the feedback loops 641 and 642, respectively. The synchronous demodulators 631 and 632 are used to synchronously detect the effect of the initial modulation of the lasers on the light transmitted by the interferometer, which is of the Fabry-Perot type. (The arrangement of the associated photo-electric detectors will be described in more detail below.)

In this case, the signals emanating from the synchronous detection are proportional to the first derivative of the intensity of light detected relative to the frequency of the light. These signals, applied at the input of the reaction links 641 and 642, permit, therefore, adjustment of the central values $f_1$ and $f_2$ of the laser radiations to obtain maximum intensity of the light transmitted around these two frequencies. For example, the slaving device may act upon the frequencies $f_1$ and $f_2$ to cancel the outputs of the synchronous demodulators 631 and 632.

For this reason, it is necessary to distinguish between the detections effected around each of the frequencies $f_1$ and $f_2$. For this purpose, an optical distinction may be made, the beams of the lasers being polarized in a distinct manner. For example, the beams may be polarized with two perpendicular rectilinear polarizations or with two circular polarizations in opposite directions. In such a case, the optical separator 53 at the output of the interferometer 40 supplies the two photo-electric detectors 51 and 52, respectively, connected to the two synchronous demodulators 631 and 632 (FIG. 2).

Another possible way of distinguishing between the two laser beams consists of time-multiplexing the modulation of the lasers 10 and 20. In this case (not shown), a single detector is connected at the output of the interferometer and its output is demultiplexed by electronic gates to be switched alternately towards one or the other of the synchronous demodulators 631 and 632.

FIG. 3 illustrates a simpler solution. The two lasers are modulated at the same frequency f but by phase quadrature signals referenced $f(0)$ and $f(\pi/2)$. A single detector 50 is connected between the interferometer 40 and the two synchronous demodulators 631 and 632. The input of the two synchronous demodulators 631 and 632 is the same. The signals in quadrature $f(0)$ and $f(\pi/2)$, respectively, are also applied to the two demodulators 631 and 632 which effect the decoupling of the laser radiations, so that the output of demodulator 631 represents the derivative of the light intensity transmitted around frequency $f_1$, and that of demodulator 632 the derivative of the light intensity transmitted around frequency $f_2$.

These outputs control, respectively, the feedback loops 641 and 642.

It will be observed that in this first embodiment, the frequencies of the two laser beams vary continuously around their central frequencies $f_1$ and $f_2$. This variation is, of course, included in the signal $\Delta F$ transmitted to the measuring stages 70 and 80.

However, as the variation is centered around the values $f_1$ and $f_2$, a statistical processing of the signal $\Delta F$, such as a mean over an adequate time interval (which is inherent in the use of a counter), permits the production of a signal representative of the difference between the central values $f_1$ and $f_2$, and therefore, a function of the distance between plates of the interferometer.

FIG. 4 illustrates a preferred alternative of the invention. As described above with reference to the drawings, the radiations of the two lasers 10 and 20 are preferably optically distinguished by giving them two distinct polarizations. The output of the interferometer 40 is brought to a beam separator 53 whose two outputs supply the two detectors 51 and 52.

In the alternative of FIG. 4, one of the plates of the interferometer is mounted, for example, on a piezo-electric wedge and the modulation signal issuing from circuit 62 is made to act on this wedge. Thus, the length of the interferometer is modulated around a central value L which is a function of the distance to be measured. The laser frequencies $f_1$ and $f_2$ are not modulated.

The operation of the remainder of the apparatus is the same as described above with reference to FIGS. 1 and 3; the two synchronous demodulators 631 and 632 are connected to the two feedback loops acting on the two laser frequencies, respectively, to obtain peaks of the transmitted light.

This alternative is preferred as it involves only the amplitude-frequency response of the interferometer, while the embodiment described above with reference to FIGS. 2 and 3 involves also the amplitude-frequency response of the lasers, because they are modulated.

In any of the embodiments described above with reference to the drawings, the detectors 50 or 51 and 52 can be of the same type as the detector incorporated in the circuit 70. The electronic slaving devices 60 may be provided with a loop cut-out and manual control. The lasers 10, 20 are brought on two different modes of the interferometer manually, after which the slaving device 60 is looped in to follow the two peaks thus reached. Naturally, an automatic search for the peaks may also be provided.

The experiments carried out with apparatus of the type described above with reference to the drawings for distances of 2, 4 and 13 meters have made it possible to obtain precision of a relative nature ranging from the order of $10^{-6}$ m in weak turbulence (laboratory surroundings without special protection) to the order of $10^{-5}$ m in very strong turbulence (compressed air jet going through the measured distance).

The embodiments described above with reference to the drawings permit rapid and accurate measurement of large mechanical parts, for example, turbine shafts and bearings, to parts for the manufacture of methane tanker tanks, large machine-tools and their automatic control, or also the wings of aircraft.

What is claimed is:

1. A process for precisely measuring distances comprising the steps of:
    arranging two spaced plates of an interferometer at a distance apart denoted L which is the distance to be measured,
    applying to the plates two beams of radiation of differing frequencies from respective single frequency lasers,
    adjusting the frequencies of the lasers independently of one another so that they correspond to two different longitudinal modes of the interferometer, respectively,
    measuring the difference ($\Delta F$) between said frequencies after adjustment,
    carrying out a rough measurement of the distance to be measured, so as to obtain a rough estimated value denoted $L_1$ of said distance to be measured,
    calculating a number $k_1$ by the equation:

$$k_1 = \frac{L_1 \times 2 \Delta F}{c}$$

where c is the speed of light in the interferometer,
    determining an integer k which is the nearest integer to $k_1$, and then
    calculating the distance (L) between the two plates of the interferometer by the equation:

$$L = \frac{kc}{2 \Delta F}$$

2. Apparatus for precisely measuring distance and comprising:
    two lasers for producing respective beams of radiation having respective differing single frequencies,
    means for varying individually the single frequencies of the two lasers,
    optical means for directing the two lasers beams from the two lasers.
    an interferometer having two plates and receiving the two laser beams from the optical means,
    slaving means for operating the means for varying individually the single frequencies of the two lasers so that they correspond to two different longitudinal modes of the interferometer, respectively,
    means for determining the difference $\Delta F$ between said frequencies after adjustment,
    rough measuring means adapted to determine a rough estimate value denoted $L_1$ of the distance between the two plates of the interferometer,
    first calculating means for calculating a number $k_1$ by the equation:

$$k_1 = \frac{L_1 \times 2 \Delta F}{c}$$

where c is the speed of light in the interferometer,
    second calculating means for determining an integer k which is the nearest integer to $k_1$, and
    third calculating means for calculating the distance (L) between the two plates of the interferometer from the difference ($\Delta F$) of the frequencies of the beams when adjusted to said two longitudinal modes, in accordance with the equation:

$$L = \frac{kc}{2 \Delta F}$$

3. Apparatus according to claim 2, wherein the slaving means comprises:
    modulation means for causing frequency modulation of the radiation transmitted by the interferometer about said two laser frequencies at respective predetermined modulation frequencies,
    means for effecting a separate synchronous detection of the radiated transmission about each of said two laser frequencies, in accordance with said modulation frequencies, and
    two feedback loops connected to said varying means for altering the frequencies of respective ones of the lasers in accordance with the respectively associated synchronous detections to tend towards an extreme of the intensity of the transmitted light at each of said two laser frequencies.

4. Apparatus according to claim 3, and further comprising means for polarizing the two beams of laser radiation with differing polarizations, the synchronous detection means including means for separating the two laser beams in accordance with said differing polarizations.

5. Apparatus according to claim 4, wherein the modulation means comprises a frequency modulator connected to frequency modulate the beams of laser radiation; and wherein the synchronous detection means comprises an optical system for separating the laser beams in accordance with their polarization, two photo-electric detectors for receiving respective ones of the separate outputs of the optical system, and two synchronous demodulation circuits which demodulate respective ones of the outputs of the photo-electric detectors relative to the modulation frequencies of the associated beams, the outputs of the synchronous demodulation circuits being connected to respective ones of the two feedback loops.

6. Apparatus according to claim 4, wherein the modulation means comprises a connection to said interferometer to move one of the plates of the interferometer at a predetermined frequency and wherein the synchronous detection means comprises an optical system for separating the two laser beams in accordance with their polarization, two photo-electric detectors for receiving respective ones of the separate outputs of the optical system, and two synchronous demodulation circuits which demodulate respective ones of the outputs of the photo-electric detectors relative to the modulation frequency of the plate of the interferometer, the outputs of the synchronous demodulation circuits being connected to respective ones of the two feedback loops.

7. Apparatus according to claim 3, wherein the modulation means comprises a frequency modulator connected to frequency modulate the beams of laser radiation at the same modulation frequency but in quadrature, and wherein the synchronous detection means comprises a single photo-electric detector for detecting the two laser beams, and two synchronous demodulation circuits which both receive the output of the single photo-electric detector and which each demodulate a respective one of the quadrature components of said output, the outputs of the two synchronous demodulation circuits being connected to respective ones of the two feedback loops.

8. Apparatus according to claim 2, wherein the two lasers are longitudinal monomode lasers.

9. Apparatus according to claim 2, wherein the two lasers are transverse monomode lasers.

10. Apparatus according to claim 2, wherein the two lasers are housed in a common enclosure and have a common electrical supply, gas circuit and cooling circuit.

* * * * *